United States Patent [19]

Lewis

[11] Patent Number: 5,170,164
[45] Date of Patent: Dec. 8, 1992

[54] APPARATUS AND METHOD FOR RECORDING CUSTOMIZED ROAD FEATURE DESCRIPTIONS WITH FEATURE LOCATION DATA

[75] Inventor: Robert L. Lewis, Austin, Tex.

[73] Assignee: Navstar Mapping Corporation, Austin, Tex.

[21] Appl. No.: 708,178

[22] Filed: May 31, 1991

[51] Int. Cl.$^5$ ............................................. G08G 1/123
[52] U.S. Cl. .................................... 340/988; 340/996;
360/12; 364/424.04; 364/449
[58] Field of Search ............... 340/988, 996, 995, 992,
340/994, 905, 438; 364/424.01, 424.02, 449,
460, 444, 424.04; 73/178 R; 360/12; 369/21

[56] References Cited

U.S. PATENT DOCUMENTS

| 4,159,490 | 6/1979 | Wood | 360/12 |
| 4,190,819 | 2/1980 | Burgyan | 364/449 |
| 4,334,248 | 6/1982 | Maiocco | 340/996 |
| 4,481,584 | 11/1984 | Holland | 340/996 |
| 4,646,089 | 2/1987 | Takanabe et al. | 340/988 |
| 4,677,429 | 6/1987 | Glotzbach | 364/424.04 |
| 4,814,711 | 3/1989 | Olsen et al. | 364/449 |
| 4,903,211 | 2/1990 | Ando | 340/995 |
| 4,937,751 | 6/1990 | Nimura et al. | 340/995 |
| 4,994,971 | 2/1991 | Poelstra | 364/424.04 |

OTHER PUBLICATIONS

Nu-Metrics, Inc., "Nu-Metrics Instrumentation Roadstar 40A Distance Measuring Computer," 1987, pp. 1–2.
Nu-Metrics, Inc., "Interfacing Trastar To The Novastar Highway Inventory System-Numetrics Product Brochure," 1987, pp. 8–9.
GeoResearch, Inc., "Digitize Directly On The Face Of The Earth-GeoLink Product Brochure".
John D. Bossler, "GPS and GIS," Geo Info Systems, Mar. 1991, pp. 27–37.
Don Cromer, "Highway Maintenance Goes High--Tech: The GIS/GPS Link," GPS World, Sep./Oct. 1990, pp. 42–44.
Peter Byman, "Mapping Finnish Roads With Differential GPS and Dead Reckoning," GPS World, Feb. 1991, pp. 38–42.
Tom Appleby, "Digital Road Mapping With GPS and GIS," GPS World, May 1991, pp. 33–37.

Primary Examiner—Jin F. Ng
Assistant Examiner—Brent A. Swarthout
Attorney, Agent, or Firm—Shaffer & Culbertson

[57] ABSTRACT

A vehicle-mounted apparatus is capable of recording customized voice road feature descriptions along with location information as the vehicle travels along the road. A vehicle location signal generating device is associated with the vehicle and is capable of producing a vehicle location signal in response to an audio input signal initiated by the device operator. When an audio input signal is entered, a processor generates a unique event sequence indicator for each audio input signal. Each event sequence indicator is unique to the particular audio input signal for which it is produced and indicates the order in which the respective audio input signal is produced in relation to any other audio input signals. An audio sequence generating device synthesizes an audio sequence signal for each event sequence indicator and this audio sequence signal is recorded in an audio recording device along with a custom feature description dictated by the device operator. In addition to the recorded audio information, a data storage device records each event sequence indicator and the vehicle location signals. This information may then be combined with the recorded audio information using matching event sequence indicators to produce a complete road feature record.

19 Claims, 5 Drawing Sheets

APPARATUS AND METHOD FOR RECORDING CUSTOMIZED ROAD FEATURE DESCRIPTIONS WITH FEATURE LOCATION DATA

BACKGROUND OF THE INVENTION

This invention relates to road feature or asset mapping, and, more particularly to an apparatus for recording custom road feature or asset descriptions with accurate location information. The invention also encompasses a method for recording custom road feature descriptions with automatically captured feature location information.

All transportation and road maintenance agencies maintain road or highway inventory records which they must update periodically. Most of these records are created by tagging or identifying each feature or asset along the particular road with an elapsed distance from a reference point. These "logmile" tags are almost universally used for recording the location of assets and features along a road or highway.

A number of different methods have been developed for recording road feature or asset inventory data. The simplest data collection method comprises travelling along the particular road and manually writing out or dictating each feature being inventoried with a corresponding logmile value observed from a vehicle's trip odometer. Automated data entry systems have also been developed in which a device operator uses a keyboard or a touch-sensitive screen to automatically record a pre-defined or canned feature description and simultaneously capture a logmile for the particular feature description. In some cases the prior information recording methods substituted a global positioning system navigation receiver for the distance measuring instrument or odometer so as to provide absolute feature or asset location information in terms of latitude, longitude, and altitude. In these road feature or asset recording systems, a global positioning system (GPS) time mark was automatically captured when a standardized feature or asset description was entered through a keyboard or a touch-sensitive screen.

Another prior method of recording road feature or asset information employed a voice speech recognition system to enter standardized feature descriptions. The voice speech recognition system replaced the keyboard or touch-sensitive screen input and was "pre-trained" to recognize an individual operator's pronunciation of certain feature cues. The system then automatically recorded the particular standardized feature description corresponding to each cue spoken by the operator. Even though the feature description recording sequence in these systems was started by a voice signal, the feature descriptions that were recorded were merely standardized descriptions like the keyboard and touch screen entry systems.

There were a number of problems associated with the prior road inventory data collection techniques. The simple written or dictated feature description and odometer reading technique was flexible and allowed customized feature descriptions, but was time consuming and required two operators to safely record all of the required information and also drive the vehicle along the road. These prior inventory data collection techniques required one operator to drive the vehicle and another operator to poll odometer readings and dictate or otherwise record the asset or feature descriptions.

On the other hand, the standardized feature description techniques, in which standardized feature descriptions were entered through keyboards, touch-sensitive screens, or voice recognition systems, in some cases required only one operator but were inflexible with regard to the feature descriptions that could be recorded. In many cases a feature or asset required some custom description that was not available in the menu of standardized feature or asset descriptions. Standardized feature description techniques have therefore been limited to special purpose applications.

There has therefore been a need for an inventory data collection technique that has the flexibility of the two person custom feature description techniques and yet can be operated by a single operator while the operator drives the vehicle along the road which is to be inventoried.

SUMMARY OF THE INVENTION

It is therefore a general object of the invention to provide an apparatus and method for recording customized road feature or asset descriptions while automatically capturing corresponding feature or asset location information.

In furtherance of this object, a vehicle-mounted apparatus includes means for recording a customized dictated feature or asset description on an audio recording medium, and also means for automatically capturing and recording on a separate medium the vehicle location information for each customized feature description. The invention also includes means for recording an event sequence indicator or signal with each customized feature description and corresponding location information. The event sequence indicator or signal identifies each customized description with each separately recorded location so that the two types of information can be combined to produce a map or record of all features or assets along a road.

In the preferred form of the invention the event sequence indicator is converted to an audio sequence signal by a computer-programmable digital voice synthesizer. The synthesized voice signal may be played over a speaker or sent directly to the audio storage device prior to each dictated, customized feature description.

The event sequence indicator is also recorded in a separate storage device along with a vehicle location signal captured automatically when the dictated feature description sequence is initiated. This vehicle location signal can be used to determine the location of the feature under the assumption that the position of the vehicle at each feature description is adjacent to the feature.

The preferred form of the invention also includes means for recording canned or pre-defined feature descriptions and also keyboard-entered customized feature descriptions. These predefined feature descriptions and manual keyboard-entered descriptions are recorded in the data storage device along with vehicle location information for the particular feature or asset. The pre-defined feature descriptions and keyboard-entered descriptions along with their corresponding locations can be combined with the voice-entered custom feature descriptions and corresponding location information to provide a complete feature or asset record.

The vehicle location information for use in the invention may be derived from either a global position system (GPS) navigation receiver or a distance measuring instrument (DMI) mounted on the vehicle. The DMI provides logmile values from a particular starting point and the GPS navigation receiver unit provides a GPS time mark from which absolute location coordinates may be calculated by interpolation from a series of separately recorded GPS coordinates.

The preferred road feature mapping or recording device is controlled through a microcomputer mounted on the vehicle. The microcomputer keyboard provides means for initiating the manual or keyed description entry, the canned or pre-defined description entry, or the custom dictated description entry. A separate audio sequence generating unit contains the digital voice synthesizer and associated circuitry, and also controls for a suitable audio storage device. The microcomputer memory storage device, preferably a removable floppy disk, comprises the data storage device for recording vehicle location information, associated event sequence indicators, manually keyed feature descriptions, and predefined feature descriptions.

After all of the information is recorded in the field, the information from the audio storage device is combined with the information in the data storage device to produce a feature map or record. The preferred combining process comprises first transcribing the audio information into a computer audio data file that is compatible with a field disk data file containing the information from the data storage device. The custom descriptions in the audio file records are then matched with their corresponding location information in the field disk data file records using the corresponding event sequence indicators.

These and other objects, advantages, and features of the invention will be apparent from the following description of the preferred embodiments, considered along with the accompanying drawings

DESCRIPTION OF THE PREFERRED EMBODIMENTS

Figure 1:
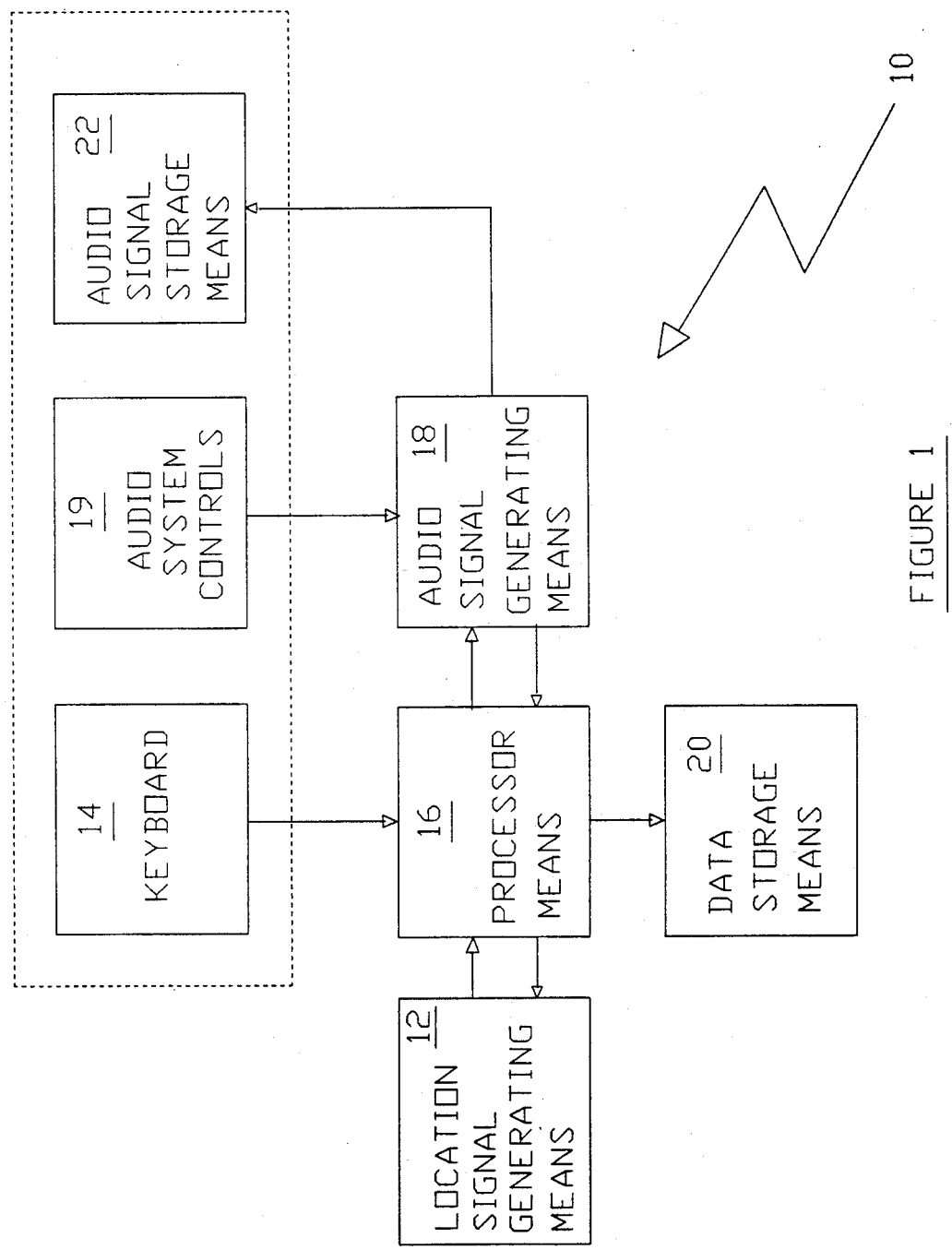
FIG. 1 is a block diagram showing a customized road feature description recording apparatus embodying the principles of the invention.

FIG. 1 shows one preferred form of the road feature information recording apparatus 10 embodying the principles of the invention. The entire apparatus 10 is mounted on a vehicle (not shown) and includes vehicle location signal generating means 12, signal initiating means 14, processor means 16, and audio signal generating means 18. The apparatus 10 also includes audio system controls 19, data storage means 20, and also audio signal storage means or audio recorder 22.

The preferred signal initiating means 14 comprises a keyboard that includes one key for producing an audio input signal when actuated The audio input signal operates to initiate a recording sequence in which vehicle location information is automatically captured and recorded in the data storage device 20 and a custom feature or asset description is dictated by the device operator and recorded in the audio signal storage device 22.

The processor means 16 preferably comprises a general purpose laptop micro-computer. The laptop computer with its attached keyboard, which preferably comprises the initiating means 14, is preferably mounted between the front seats of the vehicle on a double articulating arm (not shown). This mounting enables the computer to be operated conveniently from either seat. The data storage device 20 preferably comprises a storage device associated with the laptop computer such as a floppy or hard disk drive.

The vehicle location signal generating means 12 comprises any suitable device for generating a vehicle location signal that indicates the location of the vehicle at that particular instant. In one form of the invention the vehicle location signal generating device 12 comprises a distance measuring instrument (DMI) that provides a vehicle location signal in terms of a logmile distance from a particular starting point. The DMI may obtain input pulses from a wheel sensor or a transmission sensor as is known in the art. Alternatively, the vehicle location signal generating device 12 comprises a global position system (GPS) navigation receiver that provides a GPS time mark which may be used to derive an absolute position in terms of longitude, latitude, and altitude from the GPS receiver data recorded separately. In either case the particular vehicle location signal generating means is preferably connected to communicate a vehicle location signal to the processor 16 through a suitable communication port associated with the processor.

The audio storage means 22 may be any suitable device capable of recording voice audio signals. For example, an audio tape recorder may be employed as the audio storage device. The device 22 must also include a remote control switch (not shown in FIGURE 1) and also preferably includes an auxiliary audio input jack in addition to a microphone input.

Figure 2:
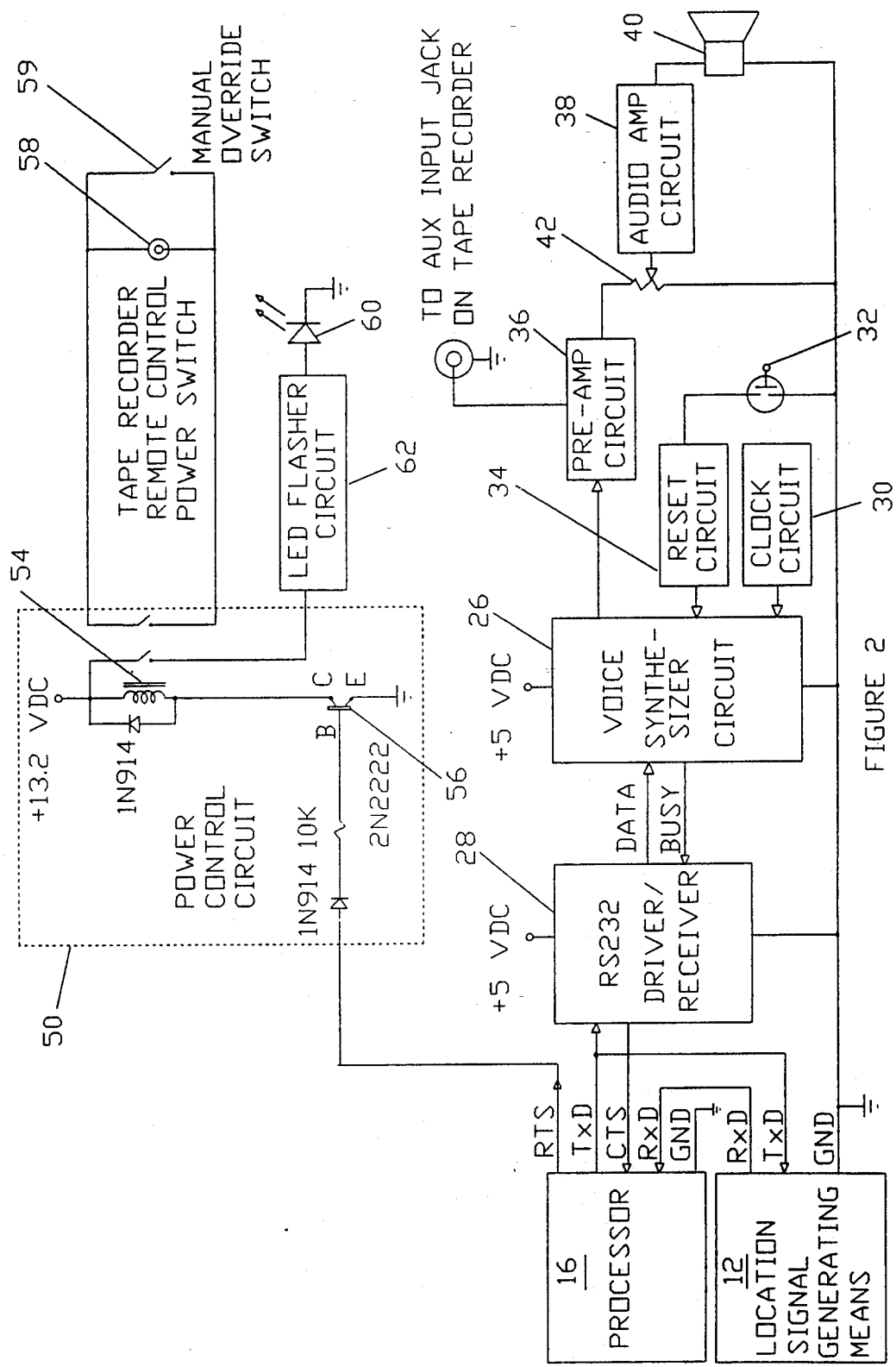
FIG. 2 is an electrical schematic diagram showing an audio sequence generating means embodying the principles of the invention.

FIG. 2 shows one preferred form of the audio sequence signal generating means 18 according to the invention. The audio sequence generating means 18 includes a voice synthesizer circuit 26 adapted to receive an input signal from the processor 16 through a suitable RS232 driver/receiver circuit 28. The voice synthesizer 26 is preprogrammed to produce a signal that may be amplified to a desired audio sequence signal capable of being recorded directly by the audio storage device 22 or amplified further to drive a loudspeaker. The model TSP53C33 voice synthesizer chip produced by Texas Instruments Company is an example of a suitable voice synthesizer circuit that may be employed according to the invention. This particular synthesizer is capable of "speaking" numbers. A clock circuit 30 is associated with the voice synthesizer circuit 26 for providing clock pulses needed by the voice synthesizer. Also, reset switch 32 and reset circuit 34 may be used to interrupt the operation of the voice synthesizer 26. The reset switch 32 forms part of the audio sequence controls 19 shown in the block diagram of FIG. 1.

The signal produced by the voice synthesizer circuit 26 shown in FIG. 2 must be amplified to produce a usable audio signal. This initial amplification is accomplished by the preamp 36. The signal output from the preamp 36 may be taken directly to an auxiliary input jack on the audio storage device 20 (FIG. 1) or amplified further by audio amplifier 38 to drive a loudspeaker 40. A variable resistance device 42 provides a volume control for the amplifier 38.

Referring still to FIG. 2, the audio sequence generating means 18 also includes a power control circuit 50 for controlling power to the audio storage or recording device 22 shown in FIGURE 1, and an indicator circuit for producing an indication when the audio storage device 22 is recording. The preferred audio recording power control circuit comprises a relay 54 controlled through a transistor 56 and whose output is connected to a remote control switch 58 on the audio storage device 22. A manual override switch 59 may be located with the audio sequence controls 19 (FIG. 1) and allows the operator to turn the recorder 22 on to record notes or other information. The indicator circuit preferably includes an LED 60 and flasher circuit 62 connected to a second output of relay 54. The flasher circuit 62 causes the LED 60 to flash periodically to provide a "recording" indication when the audio recorder 22 is on and recording audio signals.

As shown in FIG. 2 the audio sequence generating means 18 operates through the processor means 16 and is preferably connected through a serial communications port on the processor through which the vehicle location signal generator 12 communicates. The ready-to-send (RTS) pin on the serial port toggles high to cause the power control circuit 50 to turn the audio recording device 22 on. The transmit data pin (TxD) is connected to transmit the desired commands to the audio sequence generating means 18 and is also connected to transmit a polling command to the vehicle location signal generating means 12. The vehicle location signal is transmitted to the processor 16 through the receive data (R×D) pin of the serial communication port. Also, the operational status of the audio sequence generating means 18 is communicated to the processor through the clear-to-send (CTS) pin. In order to use a single communication port to transmit data to two different devices, two different baud rates are used to differentiate the two different types of data being transmitted. For example, data may be sent and received by the vehicle location signal generating means 12 at 9600 baud, while the commands transmitted to the audio sequence signal generating means 18 may be at 1200 baud.

Figure 3:
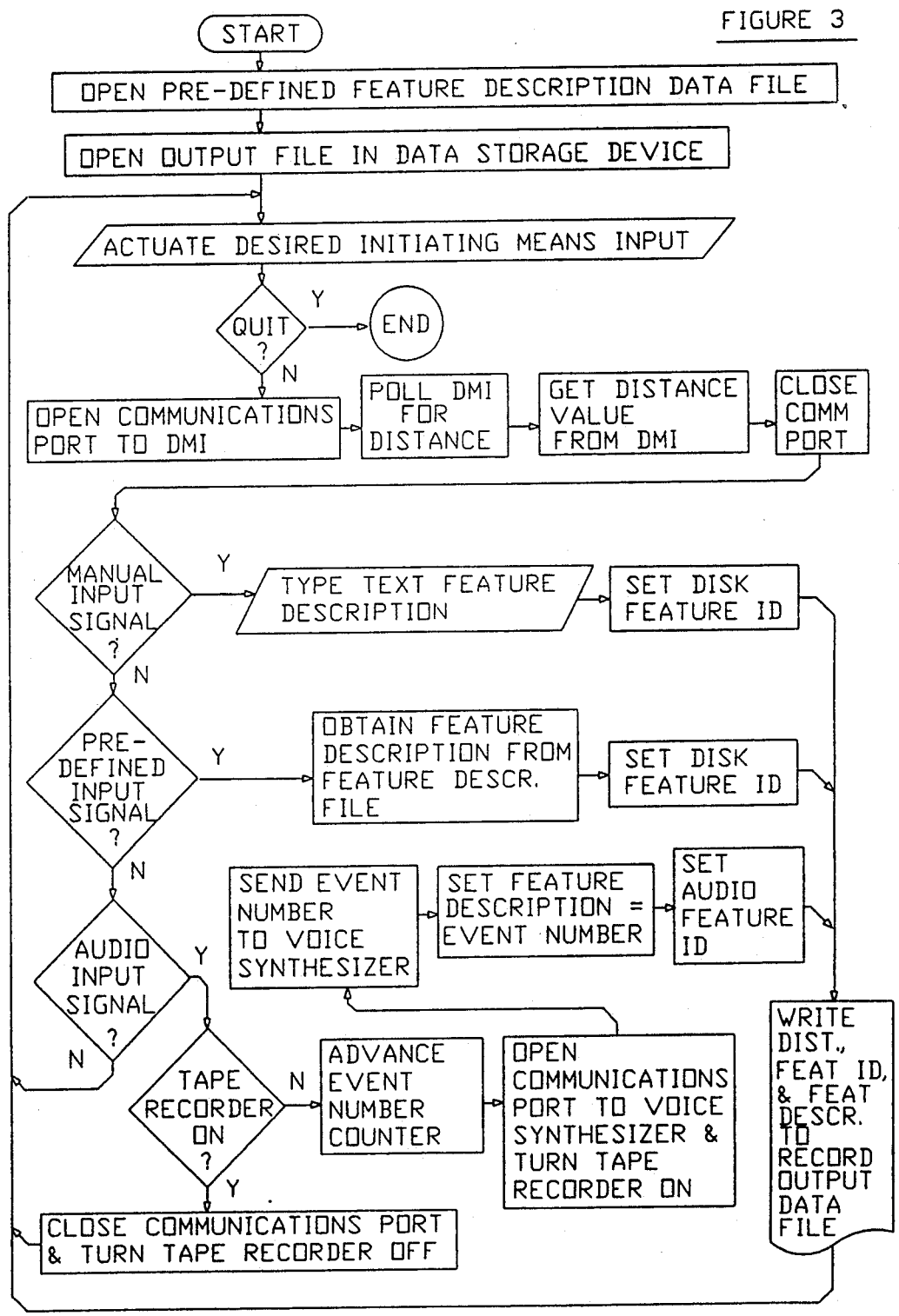
FIG. 3 is a flow chart showing the operation of the apparatus shown in FIG. 1.

The operation of the apparatus 10 may be described best with reference to the flow chart of FIG. 3 and the block diagram of FIG. 1. FIG. 3 shows three different data input options and shows the vehicle location signal generating means as being a distance measuring instrument (DMI). The first data input option is recording a dictated custom feature or asset description. A second input option includes typing a custom feature description in through the keyboard 14. The third data input option employs one or more keys of the keyboard 14 to recall a canned or predefined feature or asset description. Those skilled in the art will readily appreciate that the custom dictated or voice input may be used by itself without the other two input options or combined with either or both alternative input options according to the invention.

Referring to the dictated feature input or voice data input option, a single key on the keyboard 14, the spacebar for example, is used as an audio input initiating means for producing an audio input signal and beginning the custom voice feature description input option. When the audio input initiating key is actuated by the device operator, the audio input signal thus produced prompts, the processor 16 operates to open the serial communication port to the DMI, send a command to poll the DMI for a vehicle location signal, receive the polled signal, and then close the communication port. Input and output through the port for this operation is conducted at a first rate, 9600 baud for example.

The audio input signal also causes the processor 16 to toggle the audio storage device on through the RTS line (FIG. 2), advance an event counter, and open the serial communication port for output to the audio sequence generating means 18 at a second rate, 1200 baud for example. The processor 16 then sends the new event sequence indicator or number to the audio sequence generating means 18 for conversion to an audio sequence signal announced via the loudspeaker 40 (FIG. 2). Once the audio sequence generating means announces the audio sequence signal and the audio storage device 22 records the announced signal, the device operator may dictate a custom feature description into the audio storage device or recorder. When the device operator has completed the custom description he or she again presses the audio signal initiating key on the keyboard 14 to toggle the audio recorder 22 off.

As part of the voice data input option, the data storage device 20 associated with the processor 16 also records the unique event sequence indicator or number along with the vehicle location signal (logmile distance) obtained from the DMI 12. In forms of the invention in which voice data input is the only input option, each record in the data storage device includes only the event sequence number and the vehicle location signal.

Thus with each audio input signal the apparatus 10 automatically captures a vehicle location signal and then allows the operator to dictate a custom feature or asset description. The feature description is recorded in the audio storage device 22 along with a unique audio sequence signal or event number and the vehicle location is recorded in the data storage device 20 with a corresponding event number or sequence indicator. The audio record from the audio storage device 22 may then be transcribed and combined with the information stored in the data storage device 20 to provide an accurate feature or asset map complete with feature descriptions in any desired detail, and location information for each described feature.

In the preferred form of the invention illustrated in FIGURE 3, canned or pre-defined feature or asset descriptions may be recorded in lieu of custom descriptions dictated by the device operator. Where pre-defined feature descriptions are an option, one or more keys on the keyboard 14 comprise pre-defined input initiating means and are adapted to produce a particular predefined description input signal when actuated by the device operator.

Figure 4:
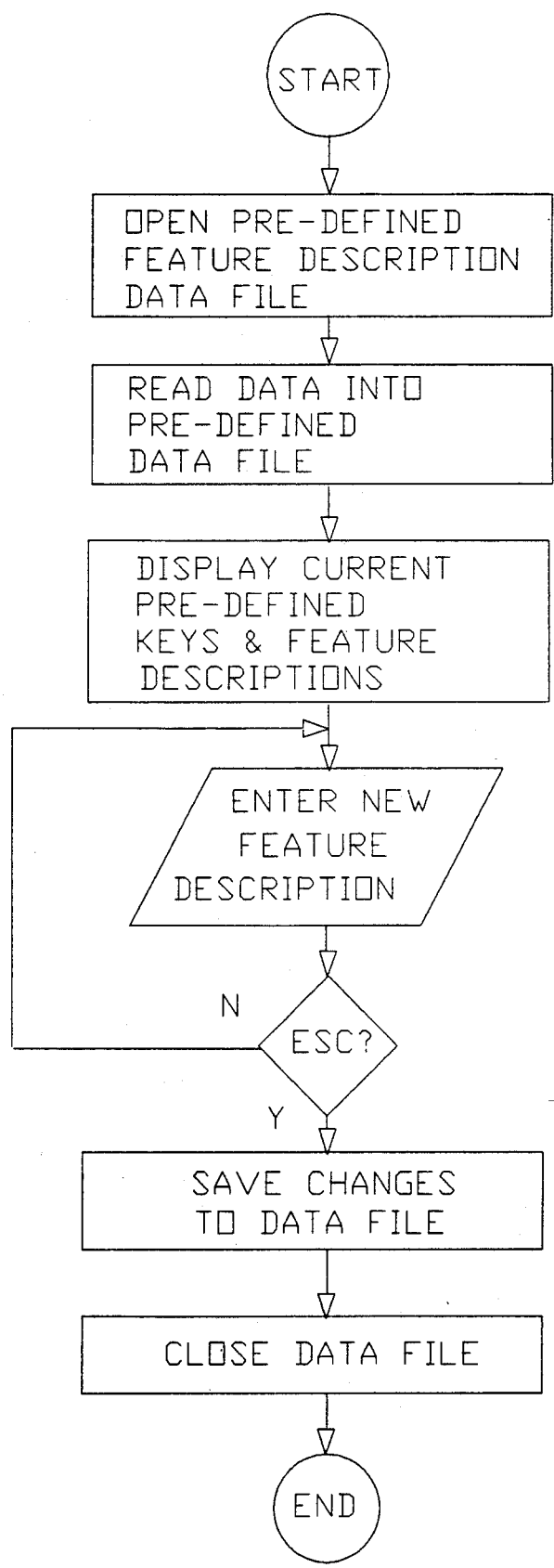
FIG. 4 is a flow chart showing one preferred method of fixing pre-defined feature descriptions.

The processor means 16 preferably has associated therewith means for defining feature descriptions and assigning such descriptions to particular keys on the keyboard 14. FIG. 4 illustrates the process for creating one or more pre-defined feature descriptions. The process includes first opening a predefined feature description data file and then reading an existing pre-defined descriptions into the file. Next, the existing feature descriptions and their corresponding keys are displayed for editing or adding new feature descriptions. Any changes are saved in the pre-defined feature description data file and the file is closed. This data file is then made available in memory for the processor 16 so that the desired feature descriptions may be recalled in response to a corresponding input signal from a pre-defined input signal initiating key.

Referring again to FIGS. 3 and 1, the pre-defined feature description option allows the device operator to choose between one of the pre-defined feature descriptions or a custom voice feature description. When a customized voice feature description is desired, the operator actuates the audio input initiating means or key and records a custom feature as previously described. The operation of the apparatus 10 is the same as if the custom voice feature description was the only option with the exception that the processor means 16 also generates an audio feature identification marker which is recorded by the data storage device 20 with each vehicle location signal and event sequence indicator or number. The audio feature identification marker is used in combining the information from the data storage device 20 with the information from the audio storage device 22 as will be discussed with reference to FIG. 5.

When a pre-defined feature description is desired, the operator actuates the key or initiating means corresponding to the desired pre-defined description. This produces a pre-defined description input signal which causes the processor means 16 to obtain a vehicle location signal from the DMI 12 similarly to the processor response to an audio input signal. Also, the pre-defined description input signal causes the processor 16 to obtain from the pre-defined description data file the particular feature description corresponding to the key that was actuated. The processor 16 also generates a disk feature identification marker and this identification marker is recorded by the data storage device 20 along with the vehicle location signal (a logmile distance in this case) and the recalled pre-defined feature description. This information may be combined with the voice data recorded by the audio storage device 22 a will be discussed with reference to FIG. 5.

The manual input option shown in FIG. 3 allows the device operator to key in a custom feature description rather that dictating such a description. In this form of the invention, an easily identified key on the computer keyboard 14, the "F1" function key, for example, comprises a manual input initiating means and is adapted to produce a manual input signal when actuated by the device operator. The manual input signal causes the processor 16 to obtain a vehicle location signal in the manner previously discussed and then pause processing to enable the operator to key in the desired information. Once the information is input, the processor 16 generates a disk feature identification marker and the data storage device records the identification marker along with the vehicle location signal and the keyed-in feature description or other information.

Figure 5:
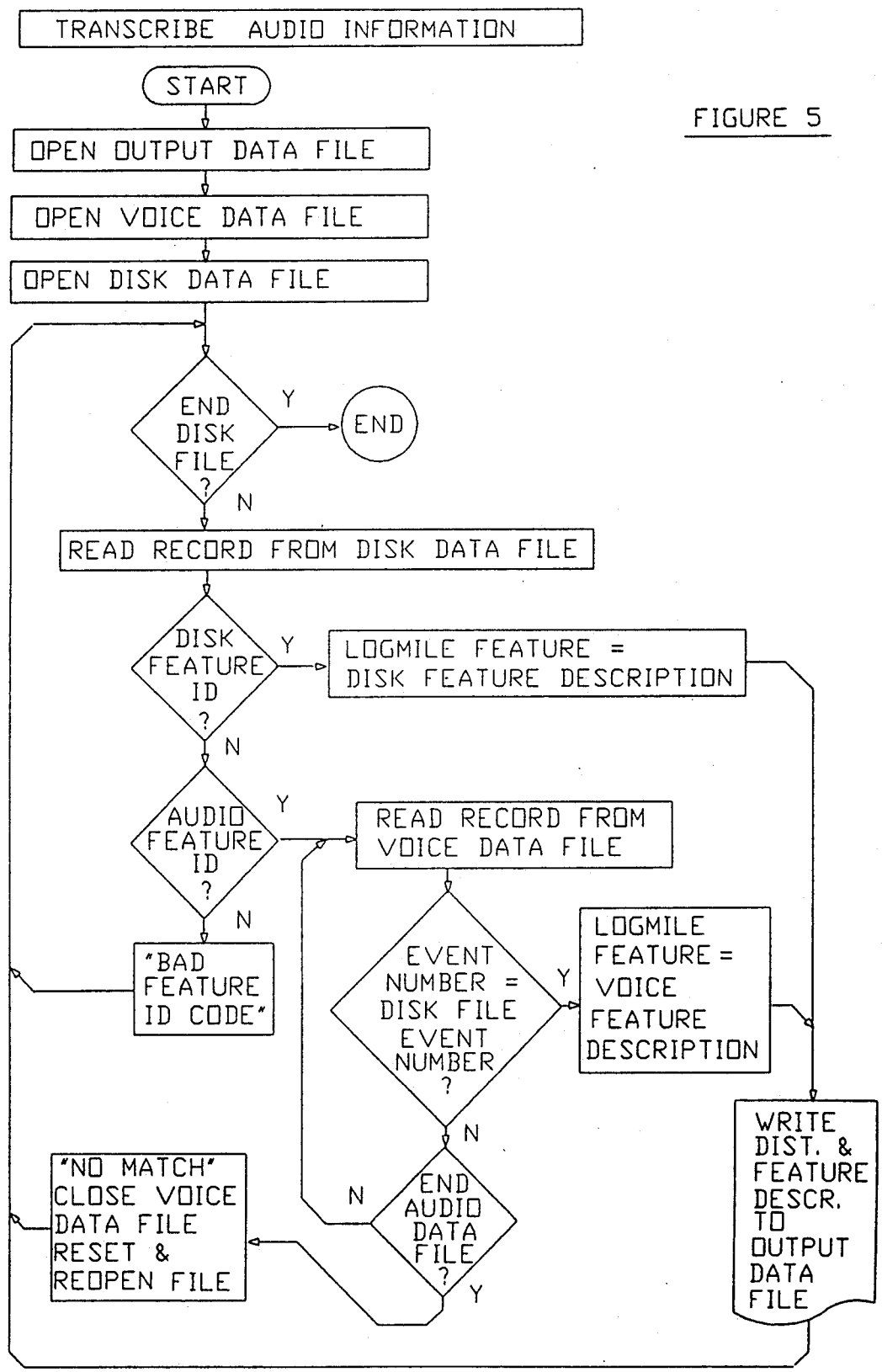
FIG. 5 is a flow chart showing the operation of combining the audio and disk files according to the invention.

FIG. 5 illustrates the preferred process for combining information recorded in the audio storage device 22 with information stored in the data storage device 20 to produce a map or record that includes custom feature descriptions and automatically captured feature location information. The process includes first transcribing the information in the audio storage device 22 (FIG. 1) and placing the information in a data file with each record in a desired order. The process also includes opening a voice data file for this transcribed information, a disk data file for the information recorded in the data storage device 20 (FIG. 1), and an output data file for receiving the combined output data.

With the files open and the field data contained in the input voice and disk data files, the combining process includes first reading a record from the disk data file. The presence of a disk feature identification marker in the record indicates that there is no corresponding information from the voice data file. The marker is then discarded, having no further use. The vehicle location signal (e.g. logmile distance) from the particular record is then recorded in the output file along with the feature description in the particular record and the next record from the disk data file is read.

The presence of the audio feature identification marker in the record from the disk data file indicates that there is information from the voice data file to be combined. The combining method includes searching the voice data file for the record that includes the event sequence signal or event number corresponding to the event number in the particular disk data file record. Once the corresponding record from the voice data storage file is located, the audio feature identification marker and the two matching event sequence signals or event numbers are discarded, having no further use. The dictated feature description from this voice data file record is recorded in the output file along with the vehicle location signal from the disk data file. Thus the output file includes a series of records with each including feature location information and either a custom feature description or one of the canned or pre-defined feature descriptions.

The process illustrated in FIG. 5 assumes that the apparatus for recording the information includes the pre-defined feature description option and/or the keyed-in custom feature description option. Where only audio or dictated feature descriptions are desired, the disk feature and audio feature identification markers are not required and the combining process includes only matching voice data file records with disk data file records having corresponding event sequence numbers.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. A vehicle-mounted apparatus for recording road feature descriptions and location information as the vehicle travels along the road, the apparatus comprising:
    (a) audio input initiating means for producing an audio input signal when actuated by a device operator;
    (b) vehicle location signal generating means for producing a vehicle location signal in response to each audio input signal, each vehicle location signal indicating the location of the vehicle at the time such a vehicle location signal is produced;
    (c) processor means for generating a unique event sequence indicator in response to each audio input signal, each event sequence indicator being unique to the particular audio input signal for which it is produced and indicating the order in which the respective audio input signal is produced in relation to other audio input signals;
    (d) audio sequence generating means for producing an audio sequence signal for each event sequence indicator;

(e) data storage means for responding to each audio input signal by recording the event sequence indicator corresponding to said audio input signal and the vehicle location signal corresponding to said audio input signal; and (f) audio storage means for recording each audio sequence signal and an audio feature description dictated by the device operator immediately after each said audio event sequence indicator is recorded.

2. The apparatus of claim 1 wherein:
(a) the vehicle location signal generating means comprises a distance measuring instrument; and
(b) the vehicle location signal comprises a digital logmile value.

3. The apparatus of claim 1 wherein:
(a) the vehicle location signal generating means comprises a global positioning system navigation receiver; and
(b) the vehicle location signal comprises a global positioning system time mark.

4. The apparatus of claim 1 wherein the audio sequence generating means comprises:
(a) a digital voice synthesizer capable of producing each audio sequence signal in a form that may be recorded by the audio storage means.

5. A vehicle-mounted apparatus for recording road feature descriptions and location information as the vehicle travels along the road, the apparatus comprising:
(a) audio input initiating means for producing an audio input signal when actuated by a device operator;
(b) pre-defined input initiating means for producing a predefined description input signal when actuated by the device operator;
(c) vehicle location signal generating means for producing a vehicle location signal in response to each audio input signal and each pre-defined description input signal, each vehicle location signal indicating the location of the vehicle at the time such vehicle location signal is produced;
(d) processor means for generating a unique event sequence indicator and an audio feature identification marker in response to each audio input signal, and a disk feature identification marker in response to each pre-defined description input signal, each event sequence indicator being unique t the particular audio input signal for which it is produced and indicating the order in which the respective audio input signal is produced in relation to any other audio input signals;
(e) audio sequence generating means for producing an audio sequence signal for each event sequence indicator;
(f) data storage means for responding to each audio input signal by recording the audio feature identification marker, the event sequence indicator corresponding to said audio input signal, and the vehicle location signal corresponding to said audio input signal, and for responding to each pre-defined description input signal by recording the disk feature identification marker, a pre-defined feature description corresponding to said pre-defined description input signal, and the vehicle location signal corresponding to said pre-defined description input signal; and (g) audio storage means for recording each audio sequence signal and an audio feature description dictated by the device operator immediately after each said audio sequence signal is recorded.

6. The apparatus of claim 5 further comprising:
(a) manual input initiating means for producing a manual input signal when actuated by the device operator;
(b) a manual input device by which the device operator may input a manual feature description;

7. The apparatus of claim 6 wherein:
(a) the vehicle location signal generating means is also for producing a vehicle location signal in response to each manual input signal;
(b) the processor means is also for generating a disk feature identification marker for each manual input signal; and
(c) the data storage means is also for responding to each manual input signal by recording the disk feature identification marker, the manual feature description corresponding to said manual input signal, and the vehicle location signal corresponding to said manual input signal.

8. The apparatus of claim 5 wherein:
(a) the vehicle location signal generating means comprises a distance measuring instrument; and
(b) the vehicle location signal comprises a digital logmile value.

9. The apparatus of claim 5 wherein:
(a) the vehicle location signal generating means comprises a global positioning system navigation receiver unit; and
(b) the vehicle location signal comprises a global positioning system time mark.

10. The apparatus of claim 5 wherein:
(a) the pre-defined input initiating means includes a keyboard containing a plurality of pre-defined description input keys; and
(b) the processor means is also for recalling a unique predefined feature description in response to a pre-defined description input signal produced through each different pre-defined description input key.

11. The apparatus of claim 10 wherein:
(a) the keyboard is connected to interface with a microcomputer;
(b) the processor means comprises the microcomputer and is also for receiving inputs from the keyboard to define and store pre-defined feature descriptions for at least some of the keys associated with the microcomputer keyboard and
(c) the data storage means is a memory storage device associated with the microcomputer.

12. The apparatus of claim 5 wherein the audio sequence generating means comprises:
(a) a digital voice synthesizer capable of producing each audio sequence signal.

13. A method for recording road feature descriptions and feature location information from a vehicle as the vehicle travels a road, the method comprising the steps of:
(a) producing an audio input signal when a customized feature description is desired for a particular feature along the road;
(b) producing a vehicle location signal in response to each audio input signal, each vehicle location signal indicating the location of the vehicle along the road at the time the particular vehicle location signal is produced;

(c) generating a unique event sequence indicator for each audio input signal, each event sequence indicator being unique to the particular audio input signal for which it is produced and indicating the order in which the respective audio input signal is produced in relation to any other said audio input signal;

(d) producing an audio sequence signal in response to each event sequence indicator;

(e) for each audio input signal, recording in a data storage device the event sequence indicator corresponding to said audio input signal, and the vehicle location signal corresponding to said audio input signal; and (f) recording in an audio signal storage device each audio sequence signal and an audio feature description dictated by the device operator immediately after each said audio sequence signal is recorded.

14. The method of claim 13 further including the steps of:

(a) producing a pre-defined input signal when a standardized feature description is desired for a particular feature along the road;

(b) producing one of the vehicle location signals in response to each pre-defined description input signal;

(c) generating an audio feature identification marker for each audio input signal;

(d) generating a disk feature identification marker for each pre-defined description input signal;

(e) for each audio input signal, recording the audio feature identification marker in the data storage device along with the event sequence indicator corresponding to said audio input signal and the vehicle location signal corresponding to said audio input signal;

(f) for each pre-defined input signal, recording in the data storage device the disk feature identification marker, a pre-defined feature description corresponding to said pre-defined description input signal, and the vehicle location signal corresponding to said pre-defined description input signal.

15. The method of claim 14 including the steps of:

(a) producing a manual input signal when a customized manual feature description is desired for a particular feature along the road;

(b) producing a vehicle location signal in response to each manual input signal;

(c) generating one of the disk feature identification marker for each manual input signal; and (d) for each manual input signal, recording in the data storage device the disk feature identification marker, a manually produced feature description input by the device operator through a suitable manual input device, and the vehicle location signal corresponding to said manual input signal.

16. The method of claim 13 wherein the step of producing a vehicle location signal comprises:

(a) polling a distance measuring instrument associated with the vehicle for a logmile value produced by the distance measuring instrument as the vehicle travels along the road.

17. The method of claim 13 wherein the step of producing a vehicle location signal comprises the step of:

(a) polling a global positioning system navigation receiver unit for a global positioning system time mark.

18. The method of claim 13 wherein the step of producing an audio sequence signal is performed by a digital voice synthesizer device under the control of a microcomputer.

19. The method of claim 13 further comprising the steps of:

(a) transcribing the audio sequence signals and audio feature descriptions recorded by the audio signal storage device; and (b) combining each transcribed audio sequence signal and corresponding audio feature description with the vehicle location signal recorded in the data storage device in response to the audio input signal for which said audio sequence signal and corresponding audio feature description were recorded.

* * * * *

UNITED STATES PATENT AND TRADEMARK OFFICE
CERTIFICATE OF CORRECTION

PATENT NO. : 5,170,164
DATED : December 8, 1992
INVENTOR(S) : Robert L. Lewis It is certified that error appears in the above-identified patent and that said Letters Patent is hereby corrected as shown below:

In Claim 5, Column 9, Line 49 of the Patent, change "t" to --to--.

Signed and Sealed this

Twelfth Day of October, 1993

BRUCE LEHMAN

*Attest:*

*Attesting Officer*     *Commissioner of Patents and Trademarks*